(12) United States Patent
Erhardt et al.

(10) Patent No.: US 11,603,995 B2
(45) Date of Patent: Mar. 14, 2023

(54) TANKLESS WATER HEATER ISOLATION VALVE ASSEMBLY

(71) Applicant: Watts Regulator Co., North Andover, MA (US)

(72) Inventors: James Erhardt, Bedford, NH (US); Mahyar Esmaili, Wilmot, NH (US)

(73) Assignee: Watts Regulator Co., North Andover, MA (US)

( * ) Notice: Subject to any disclaimer, the term of this patent is extended or adjusted under 35 U.S.C. 154(b) by 139 days.

(21) Appl. No.: 17/314,819

(22) Filed: May 7, 2021

(65) Prior Publication Data

US 2021/0381698 A1 Dec. 9, 2021

Related U.S. Application Data

(60) Provisional application No. 63/024,571, filed on May 14, 2020.

(51) Int. Cl.
| | |
|---|---|
| *F24D 19/08* | (2006.01) |
| *F16K 11/08* | (2006.01) |
| *F16K 5/04* | (2006.01) |
| *F16K 11/085* | (2006.01) |
| *F24D 19/10* | (2006.01) |

(52) U.S. Cl.
CPC .......... *F24D 19/088* (2013.01); *F16K 11/085* (2013.01); *F24D 19/1051* (2013.01); *F16K 5/04* (2013.01)

(58) Field of Classification Search
CPC ..... F24D 19/088; F24D 19/051; F16K 11/085
See application file for complete search history.

(56) References Cited

U.S. PATENT DOCUMENTS

| | | | |
|---|---|---|---|
| 7,631,662 B2 | 12/2009 | Reck | |
| 7,762,280 B2 | 7/2010 | Pettinaroli et al. | |
| 9,476,511 B2 | 10/2016 | Oh | |
| 2008/0142103 A1* | 6/2008 | Reck | ............ F16K 11/0873 137/887 |
| 2008/0314466 A1 | 12/2008 | Cimberio et al. | |

OTHER PUBLICATIONS

Continuum, "Installer's Installation Instructions Recommended Piping for Installation," date unknown, (2 pages).
Rheem, "Technical Service Department—Technical Service Bulletin," Jul. 2006, (1 page).

* cited by examiner

*Primary Examiner* — Kevin R Barss
(74) *Attorney, Agent, or Firm* — Harris Beach PLLC

(57) ABSTRACT

A tankless water heater (TWH) isolation valve includes a valve body having a plug valve port, a TWH port, a water distribution system port and a drain port. A plug valve includes at least one plug seal. The plug valve is controlled by a rotatable plug valve handle. The plug valve is disposed through the plug valve port and within the valve body. The rotatable plug valve handle includes a first plug valve handle position and a different rotated second plug valve handle position. In a normal operating mode in the first plug valve handle position, the TWH port is fluidly coupled to both of the drain port and the water system distribution port. In a drain mode, the TWH port is fluidly coupled to the drain port, and the water system distribution port is closed to the TWH port as blocked by the plug seal.

23 Claims, 13 Drawing Sheets

FIG. 2A
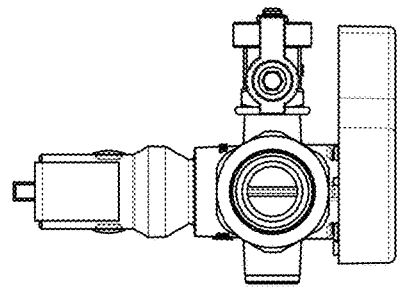
LEFT HAND
CONFIGURATION
CLOSED POSITION
FIG. 2B
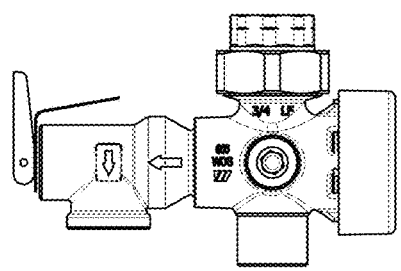
FIG. 2E
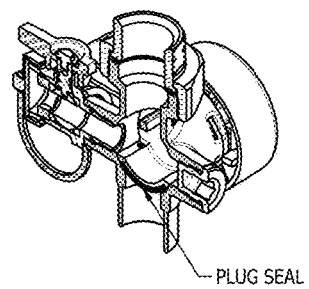
— PLUG SEAL
FIG. 2C
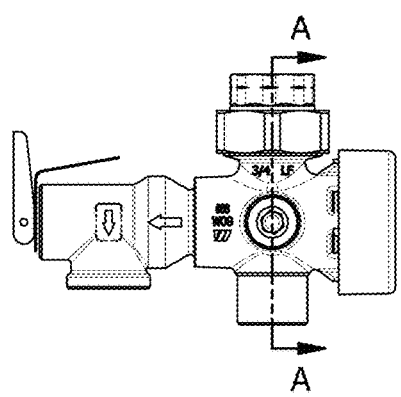
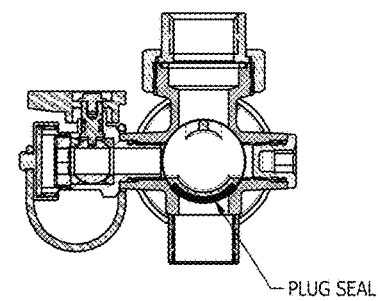
— PLUG SEAL
SECTION A-A
LEFT HAND CLOSED
SCALE .5
FIG. 2F
FIG. 2D
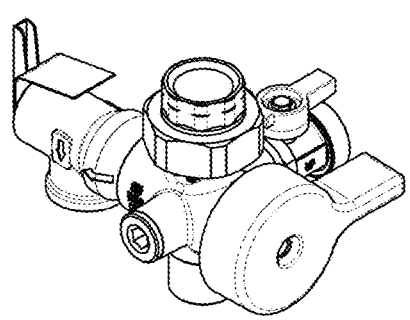

LEFT HAND
CONFIGURATION
OPEN POSITION

— PLUG SEAL

— PLUG SEAL

SECTION B-B
LEFT HAND OPEN
SCALE .5

RIGHT HAND CONFIGURATION CLOSED POSITION

PLUG SEAL

PLUG SEAL

SECTION C-C
RIGHT HAND CLOSED
SCALE .5

RIGHT HAND
CONFIGURATION
OPEN POSITION

PLUG SEAL

PLUG SEAL

SECTION D-D
RIGHT HAND OPEN
SCALE .5

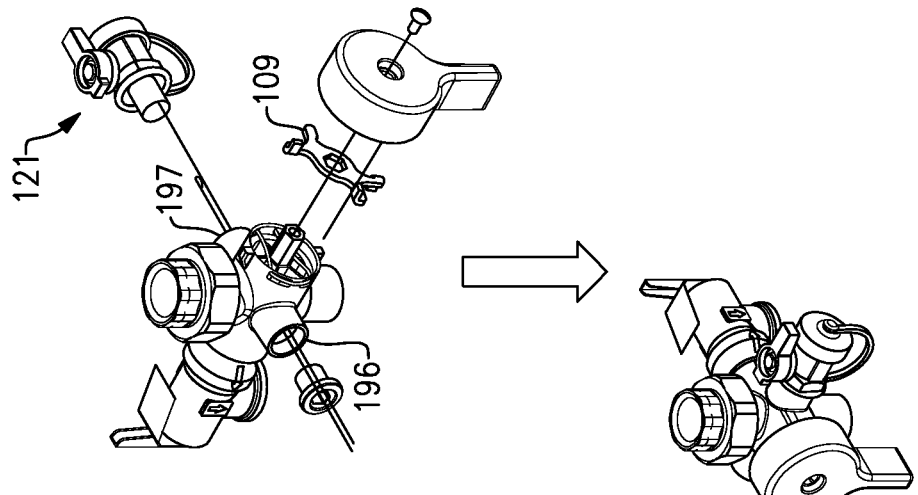
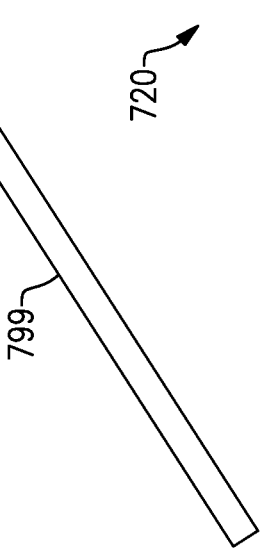
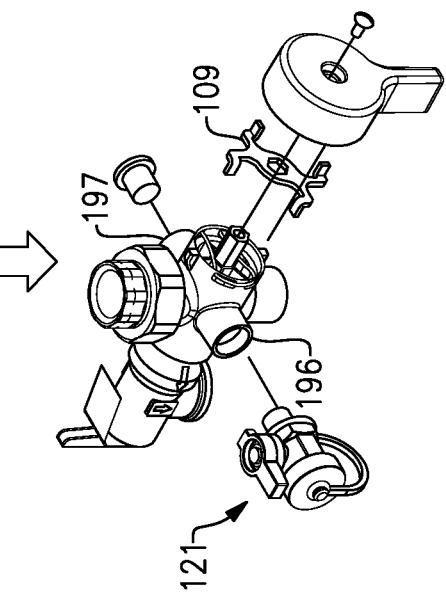
FIG.6B
FIG.6A

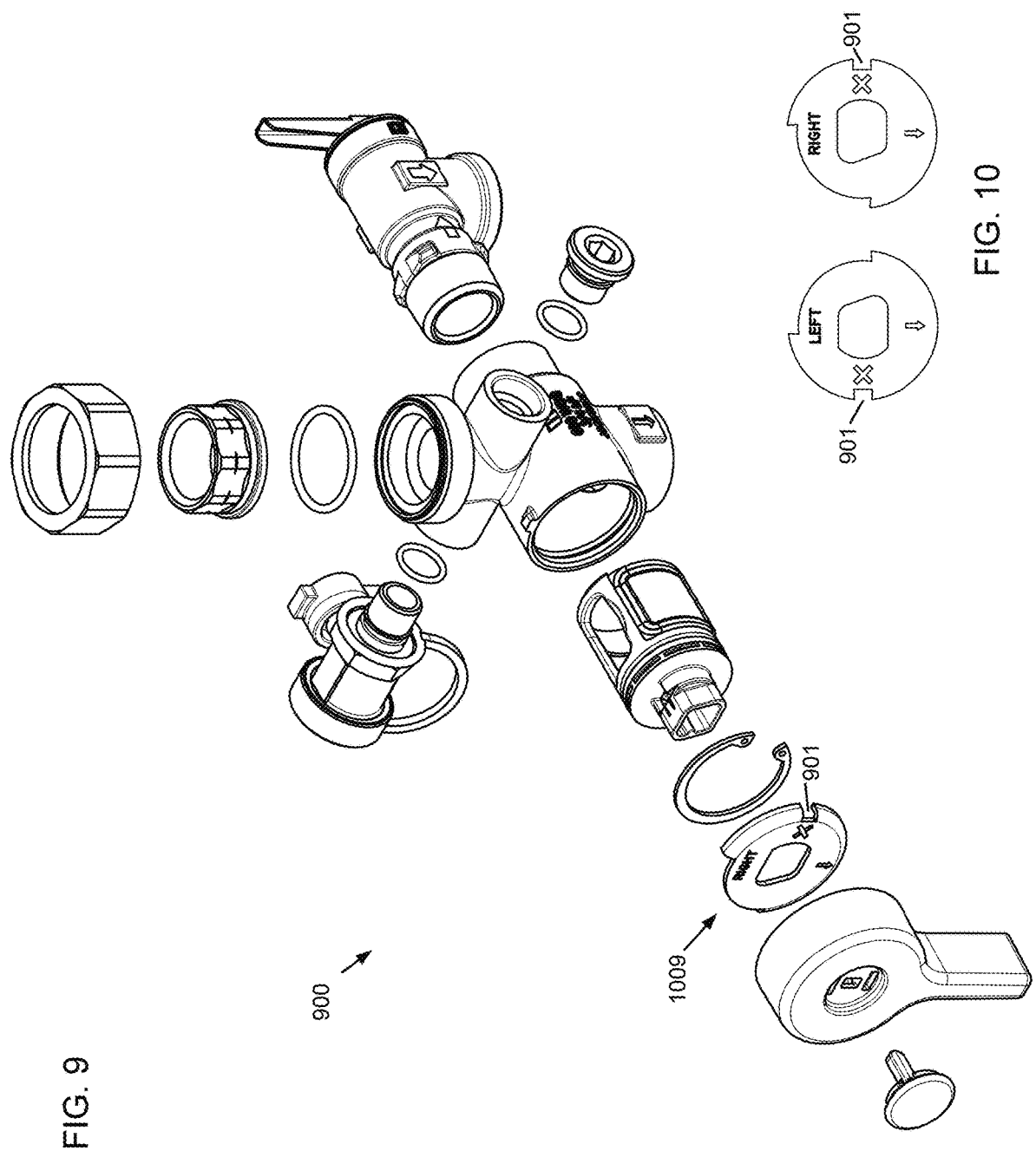

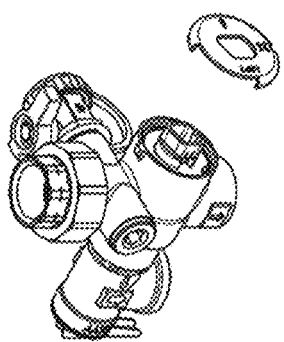
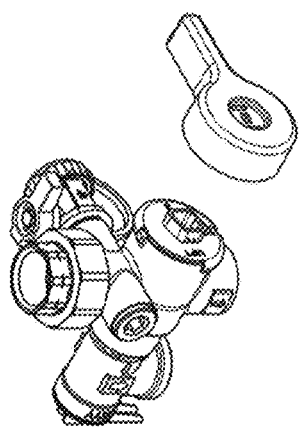
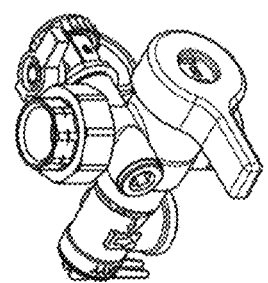
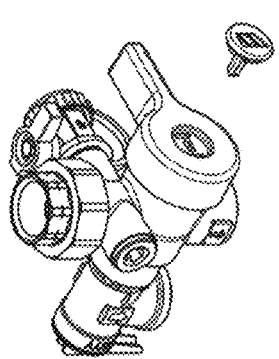
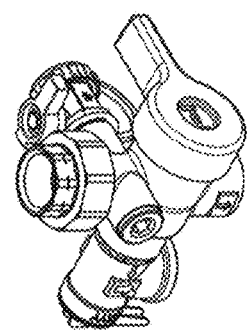
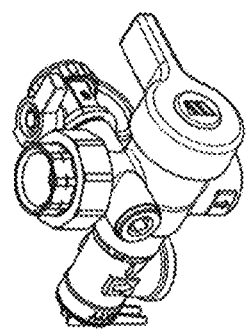
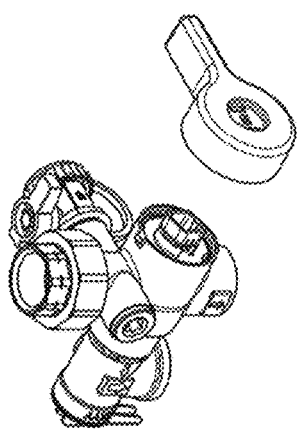
FIG. 11A 3.
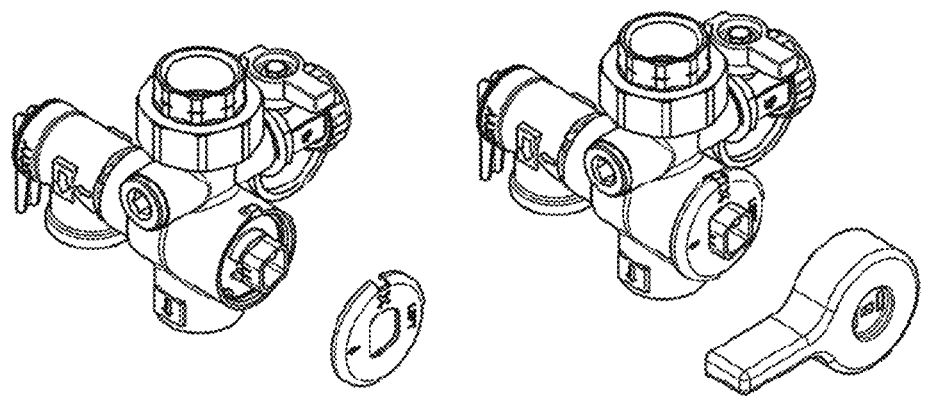
4.
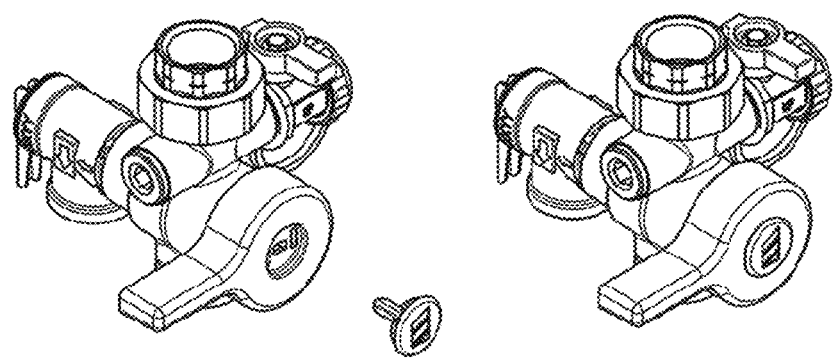
5. REVERSE STEPS
FIG. 11B

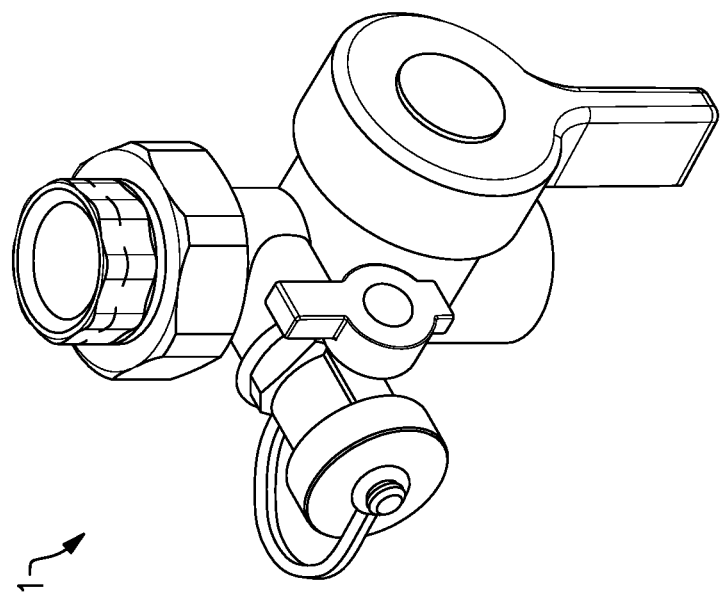
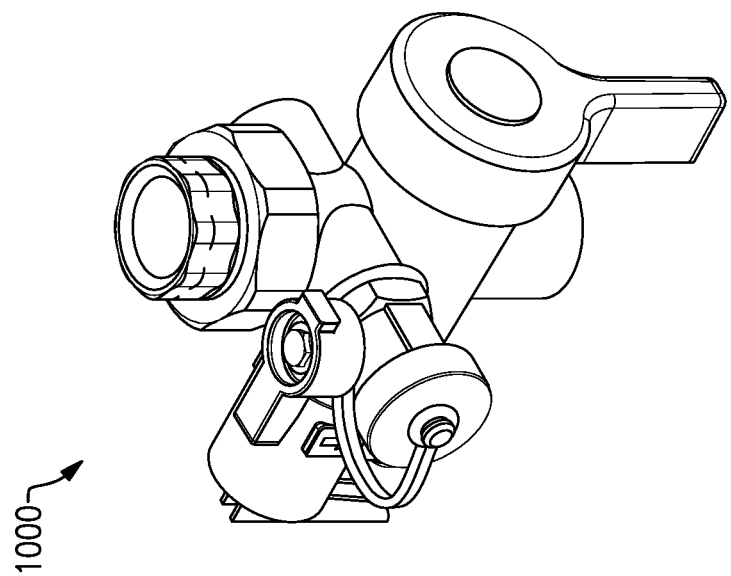
FIG.13

TANKLESS WATER HEATER ISOLATION VALVE ASSEMBLY

CROSS-REFERENCE TO RELATED APPLICATIONS

This application claims priority to and the benefit of U.S. provisional patent application Ser. No. 63/024,571, TANKLESS WATER HEATER ISOLATION VALVE ASSEMBLY, filed May 14, 2020, which application is incorporated herein by reference in its entirety.

FIELD OF THE APPLICATION

The application relates to isolation valve assemblies, particularly isolation valve assemblies for tankless water heaters.

BACKGROUND

Tankless water heaters heat a cold water flowed into the tankless water heater inlet and provide an on demand heated water from the tankless water heater outlet. One common tankless water heater preventive maintenance is to flow a mild acid such as a food grade vinegar through the internal pipes and heat exchanger to prevent buildup of deposits that could degraded efficiency of the tankless water heater, or even cause a system failure. However, it is important to not introduce the cleaning solution into the water system, typically a potable water system including home hot water systems. Therefore, isolation valve assemblies are provided which allow for the tankless water heater inlet and outlets to be isolated from the cold water feed and hot water supply lines during cleaning operations.

SUMMARY

A tankless water heater (TWH) isolation valve includes a valve body having a plug valve port, a TWH port, a water distribution system port and a drain port. A plug valve includes at least one plug seal. The plug valve is controlled by a rotatable plug valve handle. The plug valve is disposed through the plug valve port and within the valve body. The rotatable plug valve handle includes a first position and a second position. The second position is different and rotated from the first position. In a normal operating mode in the first position, the TWH port is fluidly coupled to both of the drain port and the water system distribution port. In a drain mode, the TWH port is fluidly coupled to the drain port, and the water system distribution port is closed to the TWH port as blocked by the plug seal.

The TWH isolation valve can include a cold water isolation valve. The TWH isolation valve can include a hot water isolation valve.

The TWH isolation valve can further including a pressure relief port. The TWH isolation valve can further including a pressure relief valve mechanically coupled to the pressure relief port and fluidly coupled to the TWH port in both of the first position and the second position. The pressure relief valve can be fluidly coupled to the TWH port in both of the first position and the second position.

A tankless water heater (TWH) isolation valve includes a valve body having a plug valve port, a TWH port, a water distribution system port, a first reversible port, and a second reversible port. The first reversible port is disposed about opposite to the second reversible port. A plug valve includes at least one plug seal, the plug valve controlled by a rotatable plug valve handle. The plug valve is disposed through the plug valve port and within the valve body. A drain valve is mechanically coupled to either of the first reversible port or the second reversible port, and a device mechanically coupled a different one of the first reversible port or the second reversible port. The rotatable plug valve handle has a first position and a different rotated second position. In a normal operating mode in the first position, the TWH port is fluidly coupled to both of the drain valve and the water system distribution port. In a drain mode, the TWH port is fluidly coupled to the drain valve, and the water system distribution port is closed to the TWH port as blocked by the plug seal.

The TWH isolation valve can include a cold water isolation valve. The TWH isolation valve can include a hot water isolation valve.

The TWH isolation valve can further including a pressure relief port. The TWH isolation valve can further including a pressure relief valve mechanically coupled to the pressure relief port and fluidly coupled to the TWH port in both of the first position and the different rotated second position. The pressure relief valve can be fluidly coupled to the TWH port in both of the first position and the different rotated second position.

The TWH isolation valve can include a right hand TWH isolation valve or left hand TWH isolation valve determined by which of the first reversible port or the second reversible port is mechanically and fluidly coupled to the drain valve respectively. The different one of the first reversible port or the second reversible port can be mechanically and fluidly closed by a plug or a cap.

The plug or the cap can include a threaded plug or a threaded cap.

The different one of the first reversible port or the second reversible port can be mechanically and fluidly coupled to a sensor disposed within.

The sensor can include a temperature sensor. The sensor can include a pressure sensor.

The different one of the first reversible port or the second reversible port can be mechanically and fluidly coupled to a diagnostic device during R&D testing or manufacturing testing of the TWH.

A tankless water heater (TWH) isolation valve includes a valve body having a plug valve port, a TWH port, and a water distribution system port. A plug valve includes at least one plug seal. The plug valve is controlled by a rotatable plug valve handle. The plug valve is disposed through the plug valve port and within the valve body. A drain port assembly includes at least one drain port, the at least one drain port an integral part of the valve body. The drain port assembly is disposed between the TWH port and the plug valve. The drain port assembly is offset from the plug valve.

The TWH isolation valve can further including a second drain port disposed opposite the at least one drain port, one of the at least one drain port and the second drain port to accept a drain assembly configured as either a right hand reversible TWH isolation valve or left hand reversible TWH isolation valve.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis

FIG. 2A is a drawing showing top view of an isolation valve in a left hand configuration, in the closed position;

FIG. 2B is a drawing showing back view of the isolation valve of FIG. 2A;

FIG. 2C is a drawing showing another back view of the isolation valve of FIG. 2A with section line AA;

FIG. 2D is a drawing showing an isometric view of the isolation valve of FIG. 2A;

FIG. 2E is a cut away drawing of the isolation valve of FIG. 2A;

FIG. 2F is a cut away drawing of the isolation valve of FIG. 2A along section line AA;

FIG. 6A is a drawing illustrating how a right hand TWH isolation valve can be transitioned to a left hand TWH isolation valve;

FIG. 6B is a drawing showing the transitioned right hand TWH isolation valve of FIG. 6A as a left hand TWH isolation valve;

FIG. 9 is a drawing showing an exploded view of a tankless water heater isolation valve assembly with a hydraulic isolation feature;

FIG. 10 is a drawing showing exemplary right and left plates with a notch for the hydraulic isolation feature of FIG. 9;

FIG. 11A is a drawing showing the first two exemplary steps to set hydraulic isolation;

FIG. 11B is a drawing showing the last three exemplary steps to set hydraulic isolation;

FIG. 13 is a drawing showing an exemplary pair of a hot water tankless water heater isolation valve assembly.

DETAILED DESCRIPTION

As described hereinabove, tankless water heaters heat a cold water flowed into the tankless water heater inlet and provide an on demand heated water from the tankless water heater outlet. One common tankless water heater preventive maintenance is to flow a mild acid such as a food grade vinegar through the internal pipes and heat exchanger to prevent buildup of deposits that could degraded efficiency of the tankless water heater, or even cause a system failure. However, it is important to not introduce the cleaning solution into the water system, typically a potable water system including home hot water systems. Therefore, isolation valve assemblies are provided which allow for the tankless water heater inlet and outlets to be isolated from the cold water feed and hot water supply lines during cleaning operations.

One problem with existing isolation valves for tankless water heaters is that a right hand or left hand physical configuration is fixed at time of manufacture. Such fixed structures mean either plumbing for a given right hand or left hand structure or buying particular isolation valves with a needed right hand or left hand physical configuration of ports and valves.

Therefore, there is a need for reconfigurable, swappable, or reversible isolation valves for tankless water heaters.

Also, as part of the solutions, a relatively compact isolation valve for tankless water heaters was realized, in part, by introduction of a plug type valve. With the symmetry achieved by the plug type valve, it was realized that opposing ports (e.g. threaded ports) can be introduced on either side of a new type of compact isolation valve for tankless water heaters. Either side port can be used for the purge valve/purge port part, the different opposing port either capped by a threaded plug, or available as an option port, such as for an optional sensor, such as a temperature sensor.

Figure 1:
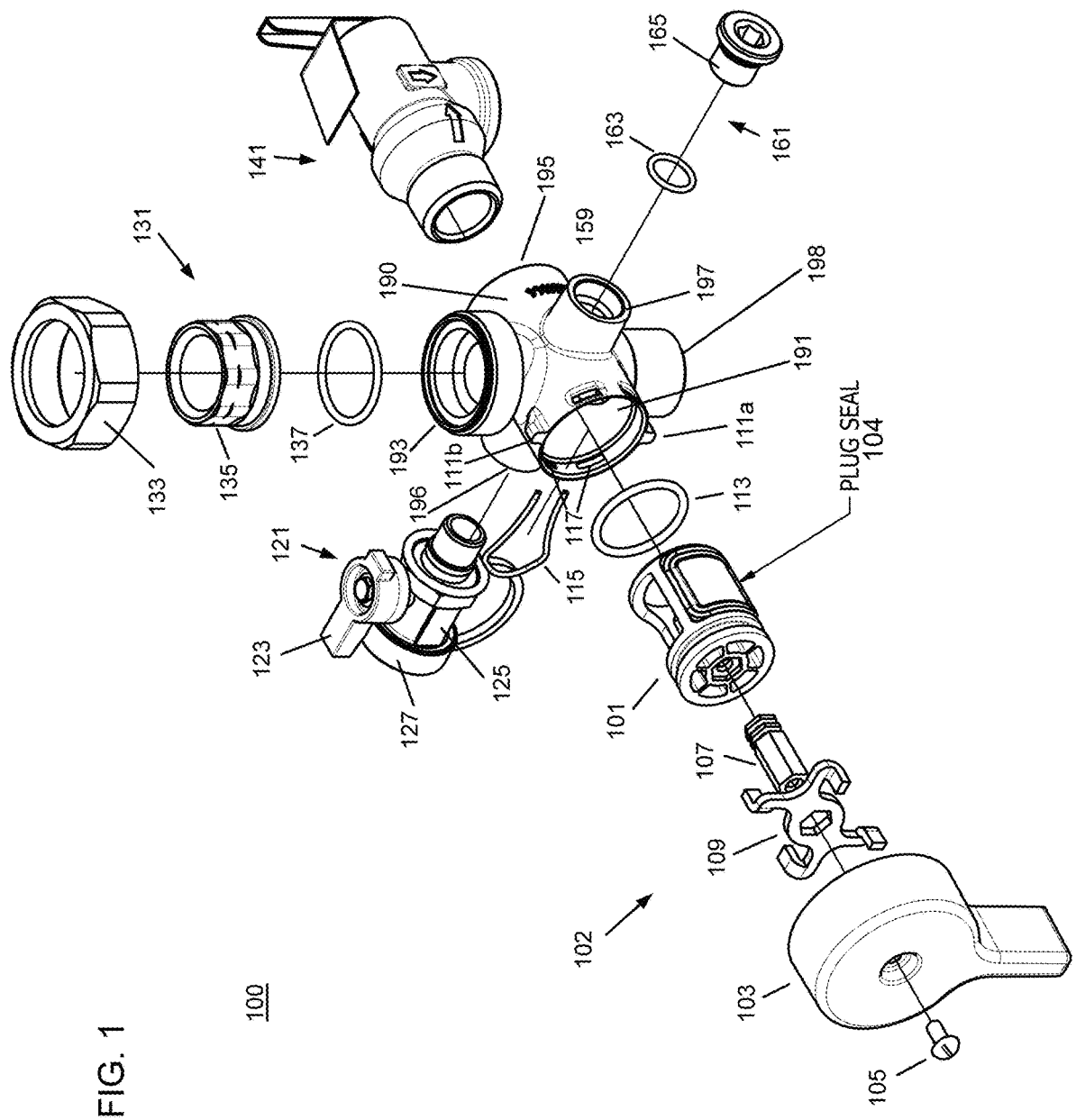
FIG. 1 is a drawing showing an exploded view of a new plug type isolation valve according to the Application.

FIG. 1 is a drawing showing an exploded view of a new plug type isolation valve according to the Application. FIG. 1 shows an exemplary isolation valve 100 typically used with tankless water heaters. Isolation valve 100 is shown configured with a pressure relief valve 141 for the hot water side of a tankless water heater. A same new type cold water isolation valve according to the Application (not shown in FIG. 1) can omit the pressure relief valve, and can also entirely omit the high pressure relief port. Continuing with FIG. 1, a hot water side isolation valve 100 includes four ports in one valve body. Port 193 is adapted to fluidly couple (typically by an intervening pipe) to the hot water outlet of the tankless water heater. Water distribution system port 198 is adapted to fluidly couple to a pipe of a hot water distribution system of a home or building. Port 196 is fluidly coupled to a drain assembly 121 which includes a second on/off valve 125 controlled by handle 123. Port 195 fluidly couples to the pressure relief valve 141 for the hot water isolation valve type.

In normal operation, isolation valve handle 103 is set so that hot water flows normally out of a tankless water heater through the isolation valve 100 and into the home or building hot water distribution system. In a drain operation, typically for testing or cleaning the tankless water heater, isolation valve handle 103 is turned 90° from the normal operation position to the drain position. In a drain operation, port 198 to the hot water distribution system of the home or building is closed.

Because of the new use of a plug valve, one aspect of what is new is that there is always water fluidly coupled to port 196, the fluid connection to the drain assembly 121, in both the normal operation and in the drain operation. One advantage of this new approach is that the drain assembly, with its own on/off valve 125, can also be used for diagnostic testing during normal water heater operation without inconveniencing hot water users in the home or building. Another advantage is that plug valve assembly 102 is relatively simple compared to more complex valves which open the normal hot water path, while closing the fluid path to the drain port. A plug valve can also be less complicated and less costly to manufacture than a ball valve of the prior art, at least in part, because the relatively large machined metallic ball is no longer required.

Another feature of the new isolation valve is that is reversible for convenient installation, where instead of some specific pipe paths appropriate to a right hand configuration or a left hand configuration, either of a left side port 196, or a right side port 197 can accept the drain assembly 121, while a plug 165 can be installed in the non-used side. FIG. 1 shows a right hand configuration, where in a typical installation below a tankless water heater, isolation valve handle 103 will be on the right side, with the drain assembly pointed outward from the tankless water heater installation (typically outward from a wall on which the tankless water is mounted) (See FIG. 5D).

Another feature of the new reversible plug valve based isolation valve 100, is that during a drain operation, the unused port (port 196 or port 197) can be used to accept an option sensor, such as, for example an option temperature sensor or pressure sensor. The extra port of the isolation valve 100 is particularly useful for factory testing, such as factory R&D work, and post production testing operations. However, there can also be diagnostic sensor uses during a drain operation for a tankless water heater installed in the field. While the unused port (port 196 or port 197) is blocked during normal operation, the unused port can still be used for a temperature sensor which does not extend all the way into the path of the rotating plug seal of the plug valve. The shallow mount temperature sensor can be used to measure the temperature of the unitary metallic isolation valve body 190 (typically brass, however any suitable metallic material can be used) of the isolation valve 100 during normal operation, a temperature, accounting for radiative loss to the ambient equipment room or basement temperature, indicative of the hot water temperature and hot water flow rate. An isolation valve body 190 can also be manufactured of any suitable non-metallic body as well, however then, the temperature sensor would only be most useful when directly exposed to the fluid flow when the plug is blocking port 198 and the unused port (196 or 197) is fluidly coupled to the fluid flow.

An additional feature of the new reversible plug valve based isolation valve 100, is that the ports 195, 196, 197 are located on a single plane. In other words, the flow paths through the ports 195, 196, 197 intersect. Placing the ports 195, 196, 197 on a single plane allows the valve 100 to have a shorter height and more easily fit within a compact space when installed on a tankless water heater. In the exemplary embodiment shown, the drain ports 196, 197 are each located ninety degrees from the pressure relief port 195. In other words the flow paths through the ports 196, 197 are perpendicular to the flow path through the port 195.

Continuing with FIG. 1, the new isolation valve 100 of the Application is described in detail beginning with a table of components for convenient reference.

| TABLE OR REFERENCE DESIGNATORS FOR FIG. 1 | |
|---|---|
| 100 | ISOLATION VALVE |
| 101 | isolation valve plug |
| 102 | plug valve ASSEMBLY |
| 103 | isolation valve handle |
| 104 | plug seal |
| 105 | isolation valve handle mounting screw |
| 107 | plug valve stem |
| 109 | reversible handle stop |
| 111a | right side normal operation stop post |
| 111b | left side normal operation stop post |
| 113 | plug end seal |
| 115 | spring clip |
| 117 | spring slot |
| 121 | drain ASSEMBLY |
| 123 | drain valve handle |
| 125 | drain valve |
| 127 | drain cap |
| 131 | tankless water heater connection ASSEMBLY |
| 133 | compression nut |
| 135 | compression insert |
| 137 | compression port seal |
| 141 | pressure relief valve ASSEMBLY |
| 163 | unused port seal (sensor port) |
| 165 | unused port plug |
| 190 | isolation valve body |
| 191 | plug valve port |
| 193 | tankless water heater port (hot water, FIG. 1) |
| 195 | pressure relief port |
| 196 | right hand isolation reversible port |
| 197 | left hand isolation reversible port |
| 198 | water distribution system port (hot water, FIG. 1) |

Plug valve—Plug valve assembly 102 makes possible the feature of the isolation valve 100 where the drain assembly is always available for use during both normal and drain operations. As shown in FIG. 1, in normal operation, plug valve assembly 102 as controlled by isolation valve handle 103 positions plug seal 104 over the unused port, thus opening a normal operation flow path between the tankless water heater (port 193) and the hot water distribution system port (port 198), thus providing a normal flow of hot water from tankless water heater to the home or building.

In a drain operation, in the right hand configuration of FIG. 1, isolation valve handle 103 is rotated 90° towards the direction of the drain assembly (typically away from the wall, pointing into the room space, handle about parallel to the long axis of the drain assembly). Now, the plug seal rotates to cover and close the hot water distribution system port 198.

The drain assembly 121 is always conveniently coupled to the tankless water heater, where the drain assembly 121 includes its own on/off drain valve 125. Thus, particularly during factory R&D or post production testing, there can be diagnostic equipment fluidly coupled to a normally operating tankless water heater by opening drain valve 125 during normal operation (or, during a drain operation).

The reversible nature of isolation valve 100 is set to a right hand configuration or a left hand configuration by interchanging (reversing or swapping) the drain assembly 121 and the unused port plug between port 196 and port 197. The plug valve assembly 102 is always present in port 191. However, for the handle to turn outward towards the direction of the of the drain assembly 121, reversible handle stop 109 can be flipped over 180° and reinstalled under isolation valve handle 103 so as to stop either against the right side normal operation stop post 111a, or the left side normal operation stop post 111b.

Isolation valve plug 101 provides the plug valve frame for rotating plug seal 104 which rotates 90° with rotation of the isolation valve handle. Plug end seal 113 can be any suitable plug valve end seal, typically an O-ring seal as shown in FIG. 1.

The plug valve assembly can be mounted in to the isolation valve body 190 by any suitable mounting means, such as, for example, by threaded nut, or by spring clip 115 and spring slots 117 as shown in FIG. 1. A retaining ring is another suitable method of assembling a plug valve (rotor) into the isolation valve body.

The drain assembly 121 includes an on/off drain valve 125 which is controlled by drain valve handle 123. Drain cap 127 can be a dust cover, such as, for example a plastic dust cap to keep the drain end clear of foreign debris and protect any machine threads. Or, drain cap 127 can be a threaded metal cap with an additional sealing washer or ring to provide a second level of drain closure in addition to drain valve 125. Drain assembly 121 can be installed in either of port 196 or port 197, typically by any suitable connection, such as, for example, a threaded mechanical connection. For example, drain assembly 121 can include outer male threads and ports 196, 197, corresponding female machine threads. Any suitable mechanical coupling can be used. Typically, the drain assembly 121 is removable so that the drain assembly can be reversed between either of ports 196, 197, however, especially because such isolation valves are typically only installed once, and are typically not reused, or re-configured during the normal lifetime of the isolation valve, the drain assembly 121 can be supplied uninstalled with a one time non-removable mechanical coupling means to either of ports 196, 197, such as by a one-time mechanical mechanism (e.g. a onetime captive snap lock), and/or adhesive or glue connection. More typically, ports 196, 197 are threaded ports which may or may not include an additional threaded sealing compound (e.g. a threaded sealing compound suitable for use with potable water). Most commonly, the drain assembly 121 and unused port plug 165 can be reversed in the field, both at the time of installation, and later if a system is re-configured, or in the less likely event that the isolation valve is re-used for another installation.

Tankless water heater port 131 can be fluidly coupled to the tankless water heater by any suitable means. For example, compression nut 133, compression insert 135, and compression port seal 137 of FIG. 1 can be used to fluidly couple the isolation valve 100 to a tankless water heater hot water outlet via a relatively short length of pipe. Any suitable connection can be used, including, for example a flange mount to a tankless water heater.

An isolation valve 100 can be provided as an individual isolation valve part. More typically isolation valves are sold in pairs, one for the tankless water heater hot water outlet (e.g. FIG. 1) and one for the cold water side without the high pressure relief valve, where the high pressure relief valve is typically only required on the hot water side. Or, such isolation valves 100 can be supplied with, or supplied already mounted to and fluidly coupled to the hot water outlet and cold water inlet of a tankless water heater.

FIG. 2A through FIG. 5F show various views of an exemplary hot water side isolation valve 100 in left hand and right hand configurations, in both a normal operation open position and a drain operation closed position. Here, open refers to the normal open path from the hot water outlet of the tankless water heater to the building hot water distribution system, and closed refers to the drain operation, where the normal open path from the hot water outlet of the tankless water heater to the building hot water distribution system is closed (shut off). The convention of left hand and right hand labels are used assuming the isolation valves are commonly installed underneath the tankless water heater. However, there is no such mounting requirement, and those skilled in the art will recognize that there may be applications where a right side installation is defined by the isolation valve handle mounted on the right side as one faces the tankless water heater typically mounted on a wall, or in other less common mounting applications, the isolation valve handle may be up, down, or left in a "right hand" isolation valve configuration. In other words is only important that the drain valve is reversable between ports 196, 197, and that the isolation valve handle 103 can be installed for any convenient 90° rotation by choice of installation size and rotatable position of rotatable handle stop 109 within the isolation valve handle 103 and with respect to the right side normal operation stop post 111a, or the left side normal operation stop post 111b.

Now, using the convention of the isolation valve mounted in the most common manner underneath a tankless water heater mounted to a wall, FIG. 2A is a drawing showing top view of an isolation valve 100 in a left hand configuration, in the closed position. FIG. 2B is a drawing showing back view of the isolation valve of FIG. 2A. FIG. 2C is a drawing showing another back view of the isolation valve of FIG. 2A with section line AA. FIG. 2D is a drawing showing an isometric view of the isolation valve of FIG. 2A. FIG. 2E is a cut away drawing of the isolation valve of FIG. 2A. FIG. 2F is a cut away drawing of the isolation valve of FIG. 2A along section line AA.

Figure 3A:
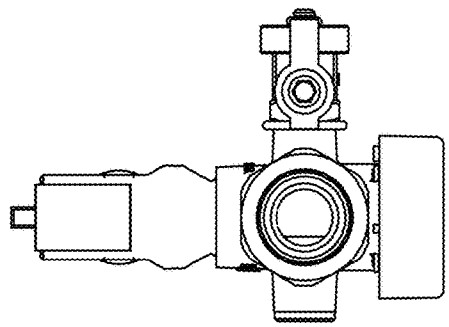
FIG. 3A is a drawing showing top view of an isolation valve in a left hand configuration, in the open position.
Figure 3B:
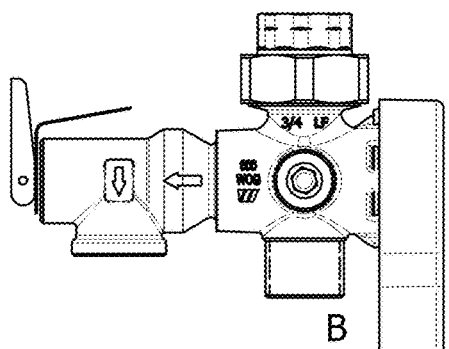
FIG. 3B is a drawing showing back view of the isolation valve of FIG. 3A.
Figure 3E:
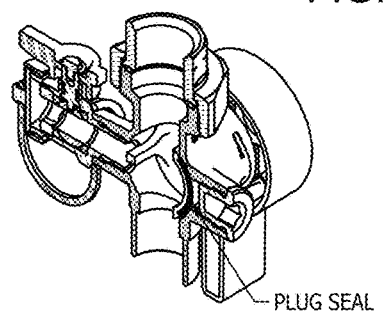
FIG. 3E is a cut away drawing of the isolation valve of FIG. 3A.
Figure 3C:
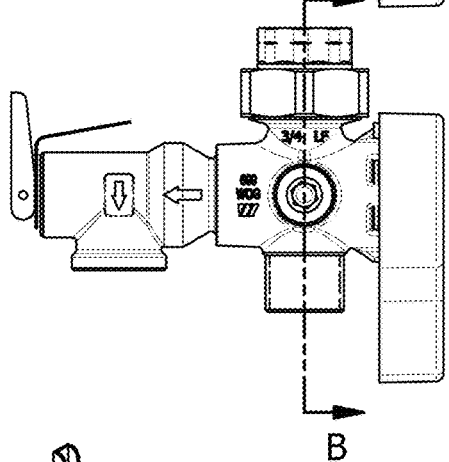
FIG. 3C is a drawing showing another back view of the isolation valve of FIG. 3A with section line BB.
Figure 3F:
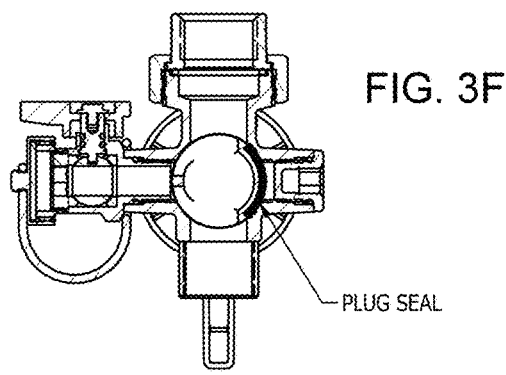
FIG. 3F is a cut away drawing of the isolation valve of FIG. 3A along section line BB.
Figure 3D:
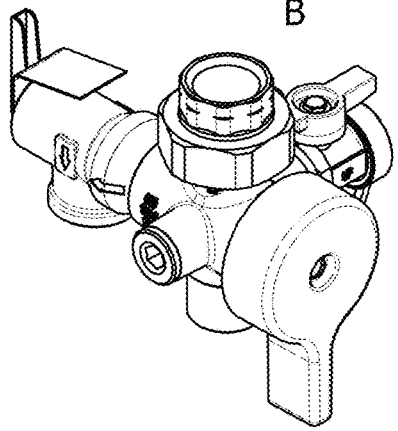
FIG. 3D is a drawing showing an isometric view of the isolation valve of FIG. 3A.

FIG. 3A is a drawing showing top view of an isolation valve 100 in a left hand configuration, in the open position. FIG. 3B is a drawing showing back view of the isolation valve of FIG. 3A. FIG. 3C is a drawing showing another back view of the isolation valve of FIG. 3A with section line BB. FIG. 3D is a drawing showing an isometric view of the isolation valve of FIG. 3A. FIG. 3E is a cut away drawing of the isolation valve of FIG. 3A. FIG. 3F is a cut away drawing of the isolation valve of FIG. 3A along section line BB.

Figure 4A:
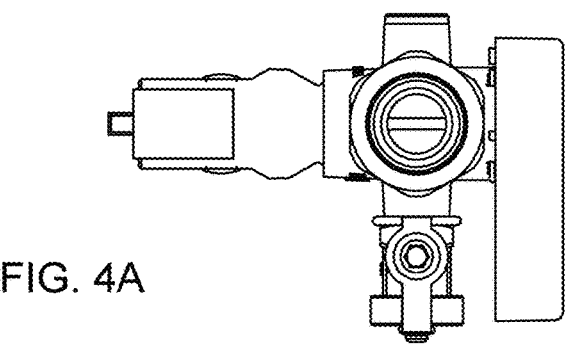
FIG. 4A is a drawing showing top view of an isolation valve in a right hand configuration, in the closed position.
Figure 4B:
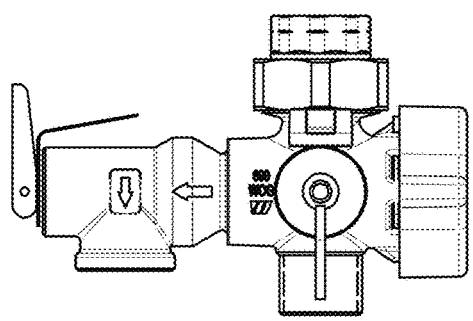
FIG. 4B is a drawing showing front view of the isolation valve of FIG. 4A.
Figure 4E:
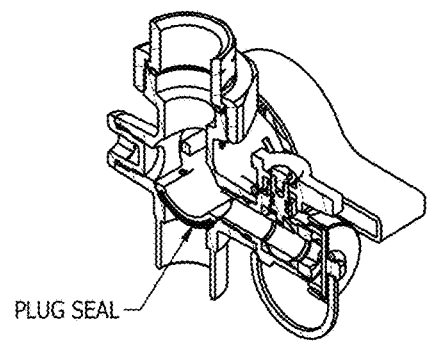
FIG. 4E is a cut away drawing of the isolation valve of FIG. 4A.
Figure 4C:
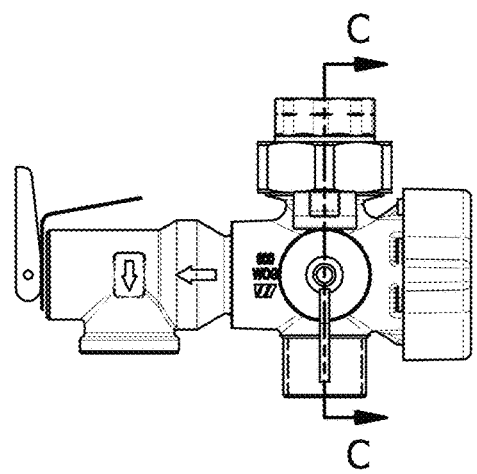
FIG. 4C is a drawing showing another front view of the isolation valve of FIG. 4A with section line CC.
Figure 4F:
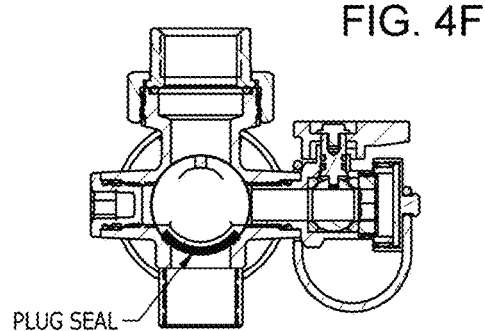
FIG. 4F is a cut away drawing of the isolation valve of FIG. 4A along section line CC.
Figure 4D:
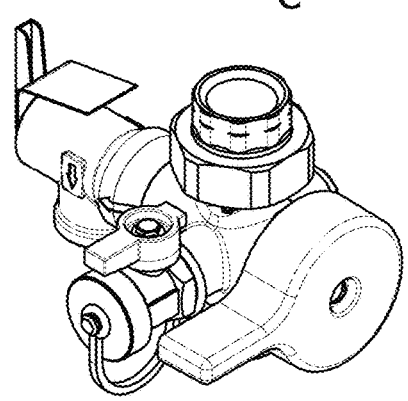
FIG. 4D is a drawing showing an isometric view of the isolation valve of FIG. 4A.

FIG. 4A is a drawing showing top view of an isolation valve 100 in a right hand configuration, in the closed position. FIG. 4B is a drawing showing front view of the isolation valve of FIG. 4A. FIG. 4C is a drawing showing another front view of the isolation valve of FIG. 4A with section line CC. FIG. 4D is a drawing showing an isometric view of the isolation valve of FIG. 4A. FIG. 4E is a cut away drawing of the isolation valve of FIG. 4A. FIG. 4F is a cut away drawing of the isolation valve of FIG. 4A along section line CC.

Figure 5A:
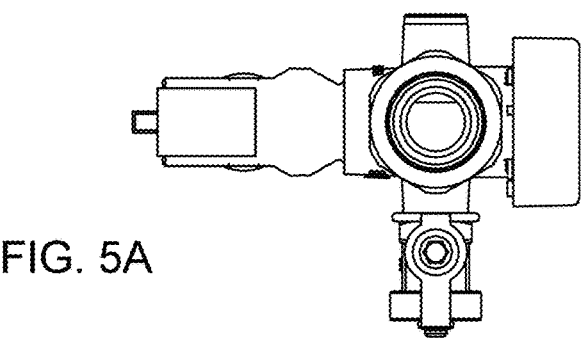
FIG. 5A is a drawing showing top view of an isolation valve in a right hand configuration, in the open position.
Figure 5B:
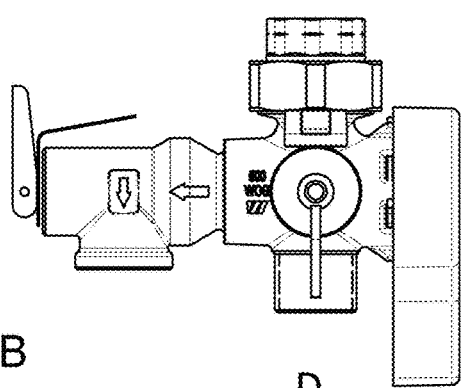
FIG. 5B is a drawing showing front view of the isolation valve of FIG. 5A.
Figure 5E:
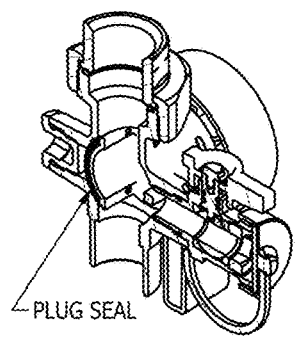
FIG. 5E is a cut away drawing of the isolation valve of FIG. 5A.
Figure 5C:
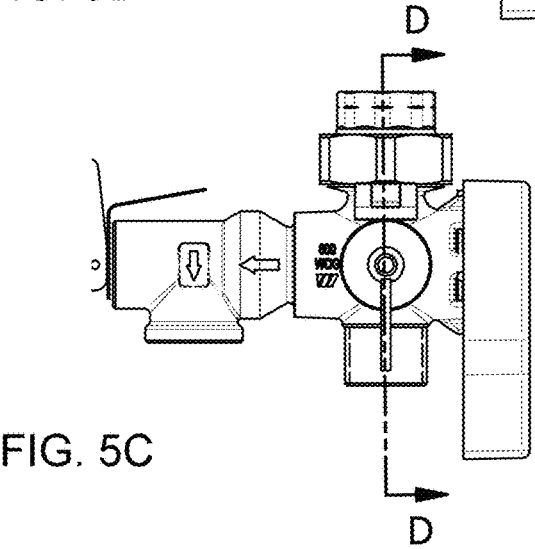
FIG. 5C is a drawing showing another front view of the isolation valve of FIG. 5A with section line DD.
Figure 5F:
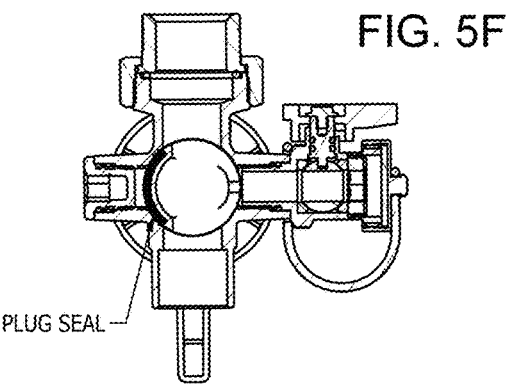
FIG. 5F is a cut away drawing of the isolation valve of FIG. 5A along section line DD.
Figure 5D:
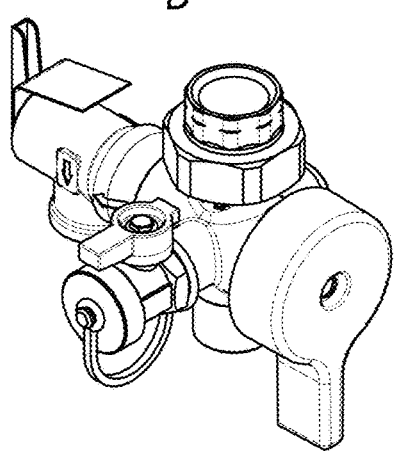
FIG. 5D is a drawing showing an isometric view of the isolation valve of FIG. 5A.

FIG. 5A is a drawing showing top view of an isolation valve 100 in a right hand configuration, in the open position. FIG. 5B is a drawing showing front view of the isolation valve of FIG. 5A. FIG. 5C is a drawing showing another front view of the isolation valve of FIG. 5A with section line DD. FIG. 5D is a drawing showing an isometric view of the isolation valve of FIG. 5A. FIG. 5E is a cut away drawing of the isolation valve of FIG. 5A. FIG. 5F is a cut away drawing of the isolation valve of FIG. 5A along section line DD.

Isolation valves according to the Application can use threaded connections. Any suitable threaded, compression, or soldered connections can be used.

Swappable Isolation Valve—FIG. 6A is a drawing illustrating how a right hand TWH isolation valve can be transitioned to a left hand TWH isolation valve;

FIG. 6A and FIG. 6B are drawings that illustrate how a right hand TWH isolation valve can be transitioned to a left hand TWH isolation valve. FIG. 6B is a drawing showing the transitioned right hand TWH isolation valve of FIG. 6A as a left hand TWH isolation valve. A swappable, or reversible isolation valve is shown as a right hand TWH hot water isolation valve 710, transitioned or re-configured as shown by arrow 799 to a left hand TWH hot water isolation valve 720. Similarly, the left hand TWH hot water isolation valve 720 can also be transitioned to a right hand TWH hot water isolation valve 710 by reversing the swappable process.

As shown in FIG. 6A and FIG. 6B, the swappable process (lower left) includes removing the drain assembly 121 from port 196, removing the unused port plug 165 from port 197, and removing the handle 103 by removing the screw 105 to remove the reversible handle stop 109. The reversible handle stop 109 is then flipped over or rotated and/or and then reinstalled between handle 103 and the isolation valve body 190. Finally, the drain assembly 121 is installed into port 197, and the port plug 165 is installed into port 196.

Typically, a TWH isolation valve can be configured at time of manufacture, at time of manufacture of the TWH were installed into a TWH product, and/or in the field when an installer installs the isolation valve, typically, but not necessarily, underneath a TWH.

Figure 7:
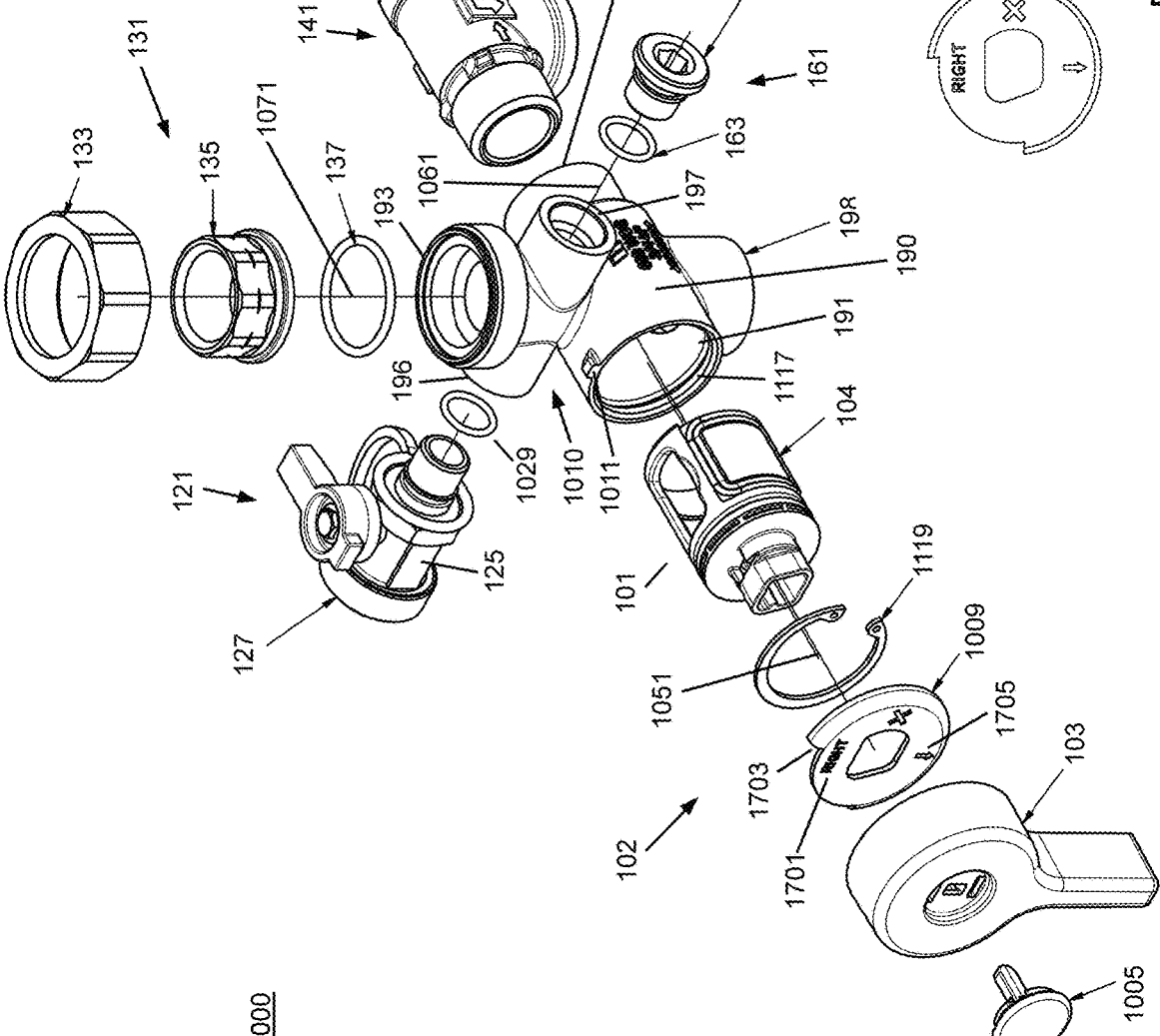
FIG. 7 is a drawing showing an exploded view of a tankless water heater isolation valve assembly.

A sensor or fluid connection to a diagnostic instrument (not shown in FIG. 1, FIG. 7) can be optionally installed into port 196 in the left hand configuration (right side of FIG. 1, FIG. 7), or into port 197 in the right hand configuration (left side of FIG. 1, FIG. 7).

In summary, and generally, with reference to FIG. 1, A tankless water heater (TWH) isolation valve 100 includes a valve body 190 having a plug valve port 191, a TWH port 193, a water distribution system port 198 and a drain port (196, FIG. 1 or 197). A plug valve 101 includes at least one plug seal 104. The plug valve 101 is controlled by a rotatable plug valve handle 103. The plug valve 101 is disposed through the plug valve port 191 and within the valve body 190. The rotatable plug valve handle 103 includes a first plug valve handle position and a different rotated second plug valve handle position. In a normal operating mode in the first plug valve handle position (FIG. 5A to FIG. 5D), the TWH port 193 is fluidly coupled to both of the drain port (196, FIG. 1 or 197) and the water system distribution port 198. In a drain mode (FIG. 4A to FIG. 4D), the TWH port is fluidly coupled to the drain port (196, FIG. 1 or 197), and the water system distribution port 198 is closed to the TWH port 193 as blocked by the plug seal 104.

Also, generally, with reference to FIG. 1, a tankless water heater (TWH) isolation valve 100 includes a valve body 190 having a plug valve port 191, a TWH port 193, a water distribution system port 198, a first reversible port 196, and a second reversible port 197. The first reversible port 196 is disposed about opposite to the second reversible port 197. A plug valve 101 includes at least one plug seal 104. The plug valve 101 is controlled by a rotatable plug valve handle 103. The plug valve 101 is disposed through the plug valve port 191 and within the valve body 190. A drain valve 121 is mechanically coupled to either of the first reversible port 196 (FIG. 6A, left side, right hand isolation valve configuration) or the second reversible port 197 (FIG. 6B, right side, left hand isolation valve configuration), and a device (e.g. unused port plug 165) is mechanically coupled a different one of the first reversible port 196 or the second reversible port 197. The rotatable plug valve handle 103 has a first plug valve handle position and a different rotated second plug valve handle position. In a normal operating mode in the first plug valve handle position, the TWH port 193 is fluidly coupled to both of the drain valve 121 and the water system distribution port 198. In a drain mode, the TWH port 193 is fluidly coupled to the drain valve 121, and the water system distribution port 198 is closed to the TWH port as blocked by the plug seal 104.

Yet another tankless water heater isolation valve assembly according to the Application is shown in FIG. 7 and FIG. 13.

FIG. 7 is a drawing showing an exploded view of a tankless water heater isolation valve assembly 1000. In this exemplary embodiment, the drain ports (isolation reversible port 196, and isolation reversible port 197) are now offset from the shut-off plug valve (e.g. raised above in FIG. 7). and the pressure relief port 195. In other words, the ports 196, 197 are located on a separate plane from the port 195. The drain ports are therefore unaffected by plug valve and are always in fluid contact with tankless water heater. One benefit of the arrangement of FIG. 7, is that the extra drain port can receive a sensor which is always in contact with the water. Any suitable sensor, including those described hereinabove can be used. Typically, the sensor will be a temperature sensor or a pressure sensor.

In FIG. 7, both of the isolation reversible port 196 and isolation reversible port 197 are now raised above the isolation valve plug 101 and the plug valve assembly 102. The isolation reversible port 196, and isolation reversible port 197 are now part of an isolation reversible port assembly 1010. Shown for reference in FIG. 7 are center lines 1051, 1061, and 1071. The Isolation reversible port assembly 1010 can be seen to be aligned with center line 1061, offset (e.g. above in FIG. 7) and perpendicular to centerline 1051 of the plug valve assembly 102.

Figure 8:
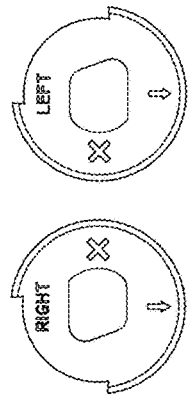
FIG. 8 is a drawing showing exemplary right and left plates.

FIG. 8 is a drawing showing exemplary right and left plates. In FIG. 7, tab 1011 stops the rotation of stop plate 1009, and in turn handle 103. Stop plate 1009 includes a handle direction orientation mark 1705, side designation text 1701, and plate stop ledge 1703. FIG. 8 is a drawing showing exemplary right and left plates Exemplary retainer ring 1119 (spring clip) snaps into trough 1117 to hold the plug valve assembly 102 together. Exemplary fastener 1005 affixes handle 103 to the isolation valve plug 101.

Isolation reversible port assembly 1010 is still physically part of the tankless water heater isolation valve assembly 1000, however the fluid flow through the isolation reversible port 196 and the isolation reversible port 197 is no longer controlled by the rotational position of the plug valve assembly 102.

FIG. 13 is a drawing showing an exemplary pair of a hot water tankless water heater isolation valve assembly 1000 and a cold water tankless water heater isolation valve assembly 1101. Note that the cold water tankless water heater isolation valve assembly 1101 does not need the pressure relief port 195. The exemplary cold water tankless water heater isolation valve assembly 1101 can optionally excludes isolation reversible port 197, or the isolation reversible port 197 can be present to allow for reversibility.

In summary, and with respect to exemplary FIG. 7, a tankless water heater (TWH) isolation valve 100 includes a valve body having a plug valve port 191, a TWH port 193, a water distribution system port 198. A plug valve 101 includes at least one plug seal 104. The plug valve 101 is controlled by a rotatable plug valve handle 103. The plug valve 101 is disposed through the plug valve port 191 and within the isolation valve body 190. A drain port assembly 1010 includes at least one drain port 196, the at least one drain port 196 an integral part of the isolation valve body 190. The drain port assembly 1010 is disposed between the TWH port 193 and the plug valve 101. The drain port assembly 1010 (center line longitudinal axis 1061) is offset from the plug valve 101 (center line longitudinal axis 1051).

Figure 14:
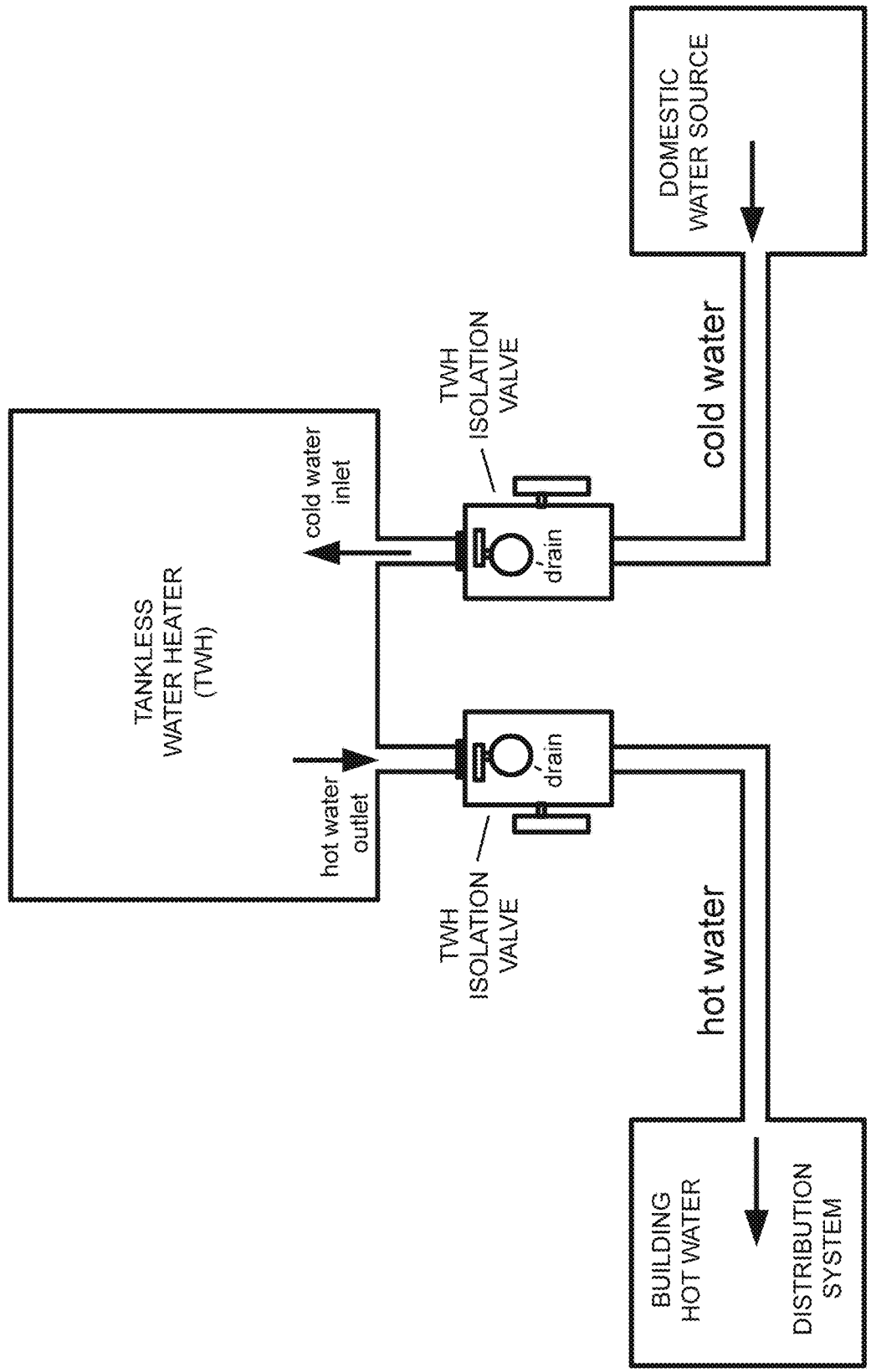
FIG. 14 is a block diagram showing how any of the embodiments of the TWH isolation valves described hereinabove can be used with a TWH in a building TWH system.

FIG. 14 is a block diagram showing how any of the embodiments of the TWH isolation valves described hereinabove can be used with a TWH in a building TWH system.

The method of changing from a right handed to a left handed configuration can includes the following steps:

1) With purge valve facing the operator and handle placed in off position (handle stem pointing towards the operator), pull handle off from the valve, disconnecting from the rotor (rotating plug)

2) Swap purge valve position with the brass plug on the opposite side of the valve 3) Rotate the whole valve assembly so the purge valve is again facing the operator 4) Remove Handle stop marked as "RIGHT HAND" and replace with additionally provided handle stop marked as "LEFT HAND"

5) Reattach handle to the rotor (rotor still in off position), with the handle stem pointing towards the operator and in the same direction as the purge valve 6) When complete, handle should now be on the left side, with operator facing purge valve, and handle stem pointing at the operator. Sealing portion of the rotor should be over the residential connection port for the hot side valve.

7) Handle will now only rotate from pointing towards the operator to 90 degrees downward pointing towards direction of the flow (away from TWH on the hot side).

Figure 12:
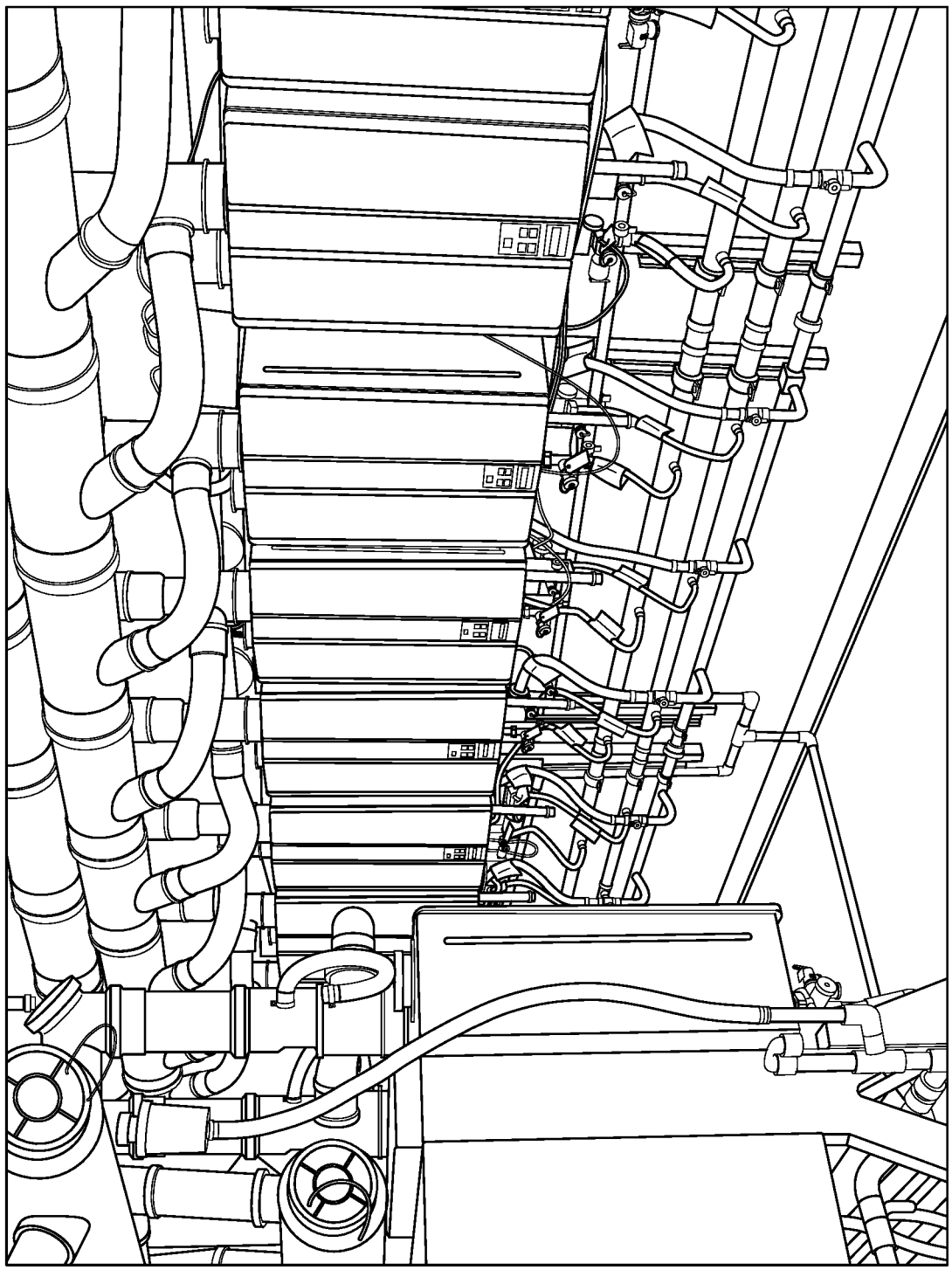
FIG. 12 is a drawing showing an exemplary hot water heaters sharing a common hot water main.

Hydraulic Isolation feature—When used in modular installations, such as where a plurality of hot water heaters share a common hot water main, a valve assembly according to the Application which further includes a hydraulic isolation feature can be field configured to provide hydraulic isolation of units that need service or repair while other units remain operating. FIG. 12 is a drawing showing an exemplary hot water heaters sharing a common hot water main.

FIG. 9 is a drawing showing an exploded view of a yet another tankless water heater isolation valve assembly with a hydraulic isolation feature. FIG. 10 is a drawing showing exemplary right and left plates with a notch for the hydraulic isolation feature of FIG. 9.

The tankless water heater isolation valve assembly of FIG. 9 and FIG. 10 is similar to the tankless water heater isolation valve assembly of FIG. 7 and FIG. 8 with the addition of hydraulic isolation position notches in the right and left stop plates.

To provide hydraulic isolation from a pressurized hot water main using the valve assembly of FIG. 9 and FIG. 10, the pressure-activated seal can be rotated 180 degrees from the bottom port to the upper port.

Generally, the plug valve is rotated into a hydraulic isolation position, and mechanically set to that position by the hydraulic isolation position notch 901 of the stop plate 1009 (FIG. 9, FIG. 10) seating over the tab 1011 (FIG. 7, FIG. 9).

As illustrated by the exemplary steps of FIG. 11A and FIG. 11B. FIG. 11A is a drawing showing the first two exemplary steps to set hydraulic isolation. FIG. 11B is a drawing showing the last three exemplary steps to set hydraulic isolation. First, A) With the valve in the closed position (handle facing forwards), remove handle plug, handle and stop plate. B) Place handle back on rotor hub and rotate 180 degrees so handle is facing rearward. C) Remove handle and re-install stop plate aligning the notch (marked with a X) with the nub on the body. D) Re-install handle (facing to the rear) and handle plug. The valve will now provide hydraulic isolation from a pressurized hot water main and be locked closed to prevent operation of water heater. Finally, E) To place heater back in commission, reverse the above process.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A tankless water heater (TWH) isolation valve comprising:
a valve body having a plug valve port, a TWH port, a water distribution system port and a drain port;
a plug valve comprising at least one plug seal, said plug valve controlled by a rotatable plug valve handle, said plug valve disposed through said plug valve port and within said valve body, said rotatable plug valve handle comprising a first position and a second position, said second position different and rotated from said first position;
wherein in a normal operating mode in said first position, said TWH port is fluidly coupled to both of said drain port and said water system distribution port; and
wherein in a drain mode, said TWH port is fluidly coupled to said drain port, and said water system distribution port is closed to said TWH port as blocked by said plug seal.

2. The TWH isolation valve of claim 1, wherein said TWH isolation valve comprises a cold water isolation valve.

3. The TWH isolation valve of claim 1, wherein said TWH isolation valve comprises a hot water isolation valve.

4. The TWH isolation valve of claim 3, further comprising a pressure relief port.

5. The TWH isolation valve of claim 4, further comprising a pressure relief valve mechanically coupled to said pressure relief port and fluidly coupled to said TWH port in both of said first position and said second position.

6. The TWH isolation valve of claim 5, wherein said pressure relief valve fluidly coupled to said TWH port in both of said first position and said second position.

7. A tankless water heater (TWH) isolation valve comprising:
a valve body having a plug valve port, a TWH port, a water distribution system port, a first reversible port, and a second reversible port, said first reversible port disposed about opposite to said second reversible port;

a plug valve comprising at least one plug seal, said plug valve controlled by a rotatable plug valve handle, said plug valve disposed through said plug valve port and within said valve body;

a drain valve mechanically coupled to either of said first reversible port or said second reversible port, and a device mechanically coupled a different one of said first reversible port or said second reversible port;

wherein said rotatable plug valve handle has a first position and a different rotated second position;

wherein in a normal operating mode in said first position, said TWH port is fluidly coupled to both of said drain valve and said water system distribution port; and wherein in a drain mode, said TWH port is fluidly coupled to said drain valve, and said water system distribution port is closed to said TWH port as blocked by said plug seal.

8. The TWH isolation valve of claim 7, wherein said TWH isolation valve comprises a cold water isolation valve.

9. The TWH isolation valve of claim 7, wherein said TWH isolation valve comprises a hot water isolation valve.

10. The TWH isolation valve of claim 9, further comprising a pressure relief port.

11. The TWH isolation valve of claim 10, further comprising a pressure relief valve mechanically coupled to said pressure relief port and fluidly coupled to said TWH port in both of said first position and said different rotated second position.

12. The TWH isolation valve of claim 11, wherein said pressure relief valve fluidly coupled to said TWH port in both of said first position and said different rotated second position.

13. The TWH isolation valve of claim 7, wherein said TWH isolation valve comprises a right hand TWH isolation valve or left hand TWH isolation valve determined by which of said first reversible port or said second reversible port is mechanically and fluidly coupled to said drain valve respectively.

14. The TWH isolation valve of claim 7, wherein said different one of said first reversible port or said second reversible port is mechanically and fluidly closed by a plug or a cap.

15. The TWH isolation valve of claim 14, wherein said plug or said cap comprises a threaded plug or a threaded cap.

16. The TWH isolation valve of claim 7, wherein said different one of said first reversible port or said second reversible port is mechanically and fluidly coupled to a sensor disposed within.

17. The TWH isolation valve of claim 16, wherein said sensor comprises a temperature sensor.

18. The TWH isolation valve of claim 16, wherein said sensor comprises a pressure sensor.

19. The TWH isolation valve of claim 7, wherein said different one of said first reversible port or said second reversible port is mechanically and fluidly coupled to a diagnostic device during R&D testing or manufacturing testing of said TWH.

20. A tankless water heater (TWH) isolation valve comprising:

a valve body having a plug valve port, a TWH port, and a water distribution system port;

a plug valve comprising at least one plug seal, said plug valve controlled by a rotatable plug valve handle, said plug valve disposed through said plug valve port and within said valve body; and a drain port assembly comprising at least one drain port, said at least one drain port an integral part of said valve body, said drain port assembly disposed between said TWH port and said plug valve, said drain port assembly offset from said plug valve.

21. The TWH isolation valve of claim 20, further comprising a second drain port disposed opposite said at least one drain port, one of said at least one drain port and said second drain port to accept a drain assembly configured as either a right hand reversible TWH isolation valve or left hand reversible TWH isolation valve.

22. The TWH isolation valve of claim 20, further comprising a stop plate having a hydraulic isolation notch.

23. A method for hydraulic isolation of a tankless water heater comprising:

with a tankless water valve in a closed position and with a tankless water valve handle facing forwards, removing a handle plug, said tankless water valve handle and a stop plate disposed under said handle;

placing said tankless water valve handle back on a rotor hub and rotating 180 degrees so that said handle is facing rearward;

removing said tankless water valve handle and re-installing said stop plate by aligning a hydraulic isolation notch of said stop plate with a nub on a body of said tankless water valve; and re-installing said tankless water valve handle facing rear and said handle plug wherein said tankless water valve provides a hydraulic isolation from a pressurized hot water main and said tankless water valve locked closed to prevent operation of the water heater.

\* \* \* \* \*